United States Patent
Dai et al.

(10) Patent No.: US 9,629,139 B2
(45) Date of Patent: Apr. 18, 2017

(54) DATA TRANSMISSION CONTROL METHOD AND SYSTEM FOR USER EQUIPMENT

(75) Inventors: Bo Dai, Shenzhen (CN); Yu Ngok Li, Shenzhen (CN); Yifei Yuan, Shenzhen (CN); Shuanshuan Wu, Shenzhen (CN); Feng Liang, Shenzhen (CN); Junfeng Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 373 days.

(21) Appl. No.: 14/371,450

(22) PCT Filed: Dec. 7, 2011

(86) PCT No.: PCT/CN2011/083618
§ 371 (c)(1),
(2), (4) Date: Jul. 10, 2014

(87) PCT Pub. No.: WO2013/000245
PCT Pub. Date: Jan. 3, 2013

(65) Prior Publication Data
US 2015/0016368 A1  Jan. 15, 2015

(30) Foreign Application Priority Data
Jun. 28, 2011 (CN) .......................... 2011 1 0177445

(51) Int. Cl.
*H04W 72/04* (2009.01)
*H04W 72/08* (2009.01)

(52) U.S. Cl.
CPC ....... *H04W 72/042* (2013.01); *H04W 72/082* (2013.01)

(58) Field of Classification Search
CPC ... H04W 76/023; H04W 72/04; H04W 92/18; H04W 76/02; H04W 72/1289;
(Continued)

(56) References Cited

U.S. PATENT DOCUMENTS

| 7,948,935 B2 * | 5/2011 | Yamada | H04L 1/003 370/328 |
| 8,744,458 B2 * | 6/2014 | Hakola | H04W 72/042 455/411 |

(Continued)

FOREIGN PATENT DOCUMENTS

| CN | 1619993 A | 5/2005 |
| CN | 101132617 A | 2/2008 |

(Continued)

OTHER PUBLICATIONS

International Search Report for PCT/CN2011/083618 dated Mar. 7, 2012.

*Primary Examiner* — Hanh N Nguyen
(74) *Attorney, Agent, or Firm* — Ling Wu; Stephen Yang; Ling and Yang Intellectual Property (57) ABSTRACT

The present document provides a method and system for controlling data transmission of a User Equipment (UE). The method includes: a base station transmitting control information for instructing a first UE to transmit data to a second UE. The present document solves the interference problem in device to device communication and communication in the original network, realizes the direct UE to UE communication and improves spectrum efficiency.

7 Claims, 5 Drawing Sheets

(58) Field of Classification Search
CPC ....... H04W 72/12; H04W 4/00; H04W 72/02;
H04W 72/0453; H04W 74/00; H04W
76/00; H04W 28/00; H04W 72/1284;
H04W 72/042; H04W 72/0406; H04W
76/025; H04L 5/00; H04L 5/0053; H04L
5/0092; H04L 5/0023; H04L 5/0007;
H04L 5/0055
USPC ....... 370/329, 330, 318, 319, 343, 344, 468,
370/395.21, 426, 427, 428
See application file for complete search history.

(56) References Cited

U.S. PATENT DOCUMENTS

| | | | | |
|---|---|---|---|---|
| 8,923,254 | B2* | 12/2014 | Park | ................. H04L 5/0092 |
| | | | | 370/329 |
| 9,088,970 | B2* | 7/2015 | Kwon | ................. H04W 72/04 |
| 2009/0323625 | A1* | 12/2009 | Lee | ................. H04W 72/042 |
| | | | | 370/329 |
| 2013/0102320 | A1* | 4/2013 | Suzuki | ................. H04W 72/042 |
| | | | | 455/452.1 |

FOREIGN PATENT DOCUMENTS

| | | | |
|---|---|---|---|
| CN | 101166195 | A | 4/2008 |
| CN | 101984719 | A | 3/2011 |
| EP | 1998499 | A1 | 12/2008 |
| WO | 2010049801 | A1 | 5/2010 |

* cited by examiner

FIG. 1

Prior Art

DATA TRANSMISSION CONTROL METHOD AND SYSTEM FOR USER EQUIPMENT

TECHNICAL FIELD

The patent document relates to the field of communications, and in particular, to a method and system for controlling data transmission of a User Equipment (UE).

BACKGROUND OF THE RELATED ART

Figure 1:
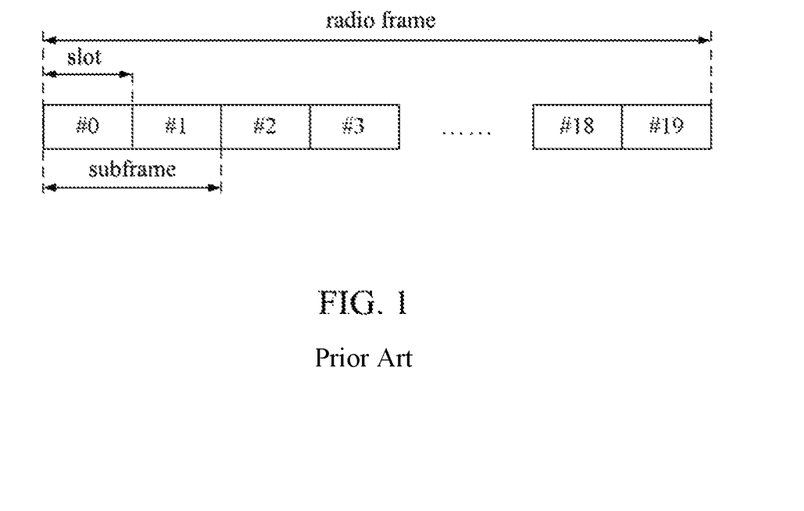
FIG. 1 is a diagram of a frame structure of an FDD mode in the related art.
Figure 2:
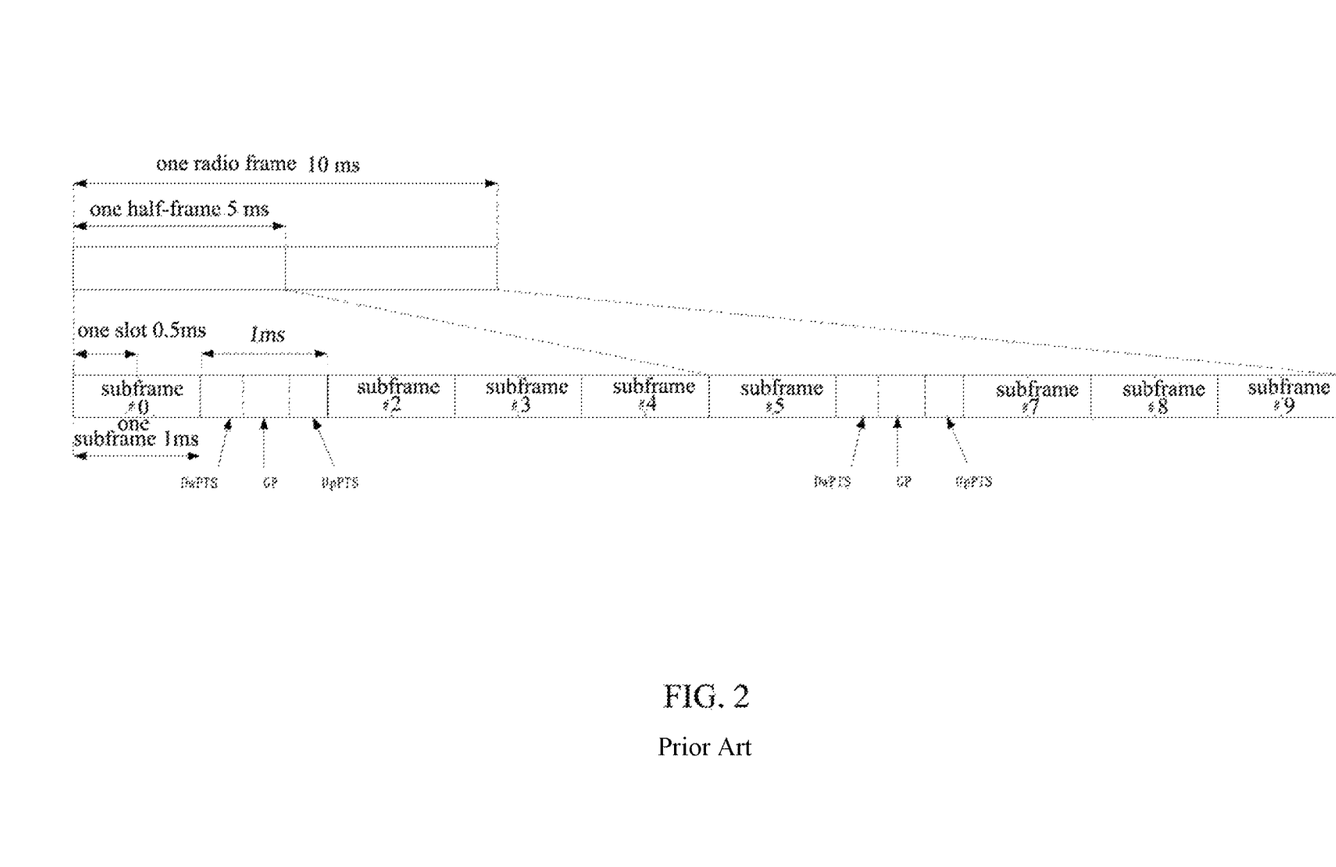
FIG. 2 is a diagram of a frame structure of an TDD mode in the related art.

There are two kinds of frame structures in a Long Term Evolution (LTE) system. Frame structure type 1 is suitable for full-duplex and half-duplex Frequency Division Duplex (FDD). Each radio frame has a length of 10 ms and it is composed of 20 slots, each slot being 0.5 ms, and the slots are numbered from 0 to 19. One subframe is composed of two consecutive slots, for example, a subframe i is composed of two consecutive slots 2i and 2i+1. No matter whether the half-duplex FDD or the full-duplex FDD, uplink and downlink are transmitted in different frequencies, but for the half-duplex FDD, the UE can not transmit and receive data at the same time; and for the full-duplex FDD, there is no such limitation, i.e., there may be 10 downlink frames and 10 uplink frames within each 10 ms interval. As shown in FIG. 1, frame structure type 2 is suitable for the Time Division Duplex (TDD). One radio frame has a length of 10 ms, and it is composed of two half-frames with a length of 5 ms. One half-frame is composed of 5 subframes with a length of 1 ms. The supported uplink and downlink configurations are shown in Table one, wherein, in the table, "D" represents that the subframe is a downlink subframe, "U" represents that the subframe is an uplink subframe, and "S" represents that the subframe is a special subframe. The special subframe is composed of DwPTS, GP and UpPTS, with a total length of 1 ms. Each subframe i is composed of two slots 2i and 2i+1 with a length of 0.5 ms (15360×Ts), as shown in FIG. 2.

The frame structure Type 2 supports two uplink-downlink switching periods of 5 ms and 10 ms. In the 5 ms uplink-downlink switching period, both half-subframes have special subframes. In the 10 ms uplink-downlink switching period, only the first half-frame has a special subframe. Subframes 0 and 5 and the DwPTS are always reserved for the downlink transmission. The UpPTS and a subframe immediately following a special subframe are always reserved for the uplink transmission. Therefore, for the 5 ms uplink-downlink switching period, the UpPTS and subframes 2 and 7 are reserved for uplink transmission; and for the 10 ms uplink-downlink switching period, the UpPTS and subframe 2 are reserved for uplink transmission;

TABLE ONE

Uplink and downlink configurations

| Uplink and downlink configurations | Switching period from a downlink to an uplink | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The following three downlink physical control channels are defined in the LTE: a Physical Control Format Indicator Channel (PCFICH); a Physical Hybrid Automatic Retransmission Request Indicator Channel (PHICH); and a Physical Downlink Control Channel (PDCCH).

Wherein, the information carried in the PCFICH is used to indicate the number of Orthogonal Frequency Division Multiplexing (OFDM) symbols for transmitting the PDCCH in one subframe, and it is transmitted in a first OFDM symbol of the subframe, and a frequency location where the information is located is determined by a system downlink bandwidth and a cell Identity (ID).

The PHICH is used to carry Acknowledgement/Negative Acknowledgement (ACK/NACK) feedback information of the uplink transmission data. The number of PHICHs and the time-frequency location can be determined by system information and a cell ID in a Physical Broadcast Channel (PBCH) of a downlink carrier where the PHICH is located.

The PDCCH is used to carry Downlink Control Information (DCI), including uplink PUSCH scheduling information, downlink PDSCH scheduling information and uplink transmission power control.

The DCI formats are divided into the following several types: DCI format 0, DCI format 1, DCI format 1A, DCI format 1B, DCI format 1C, DCI format 1D, DCI format 2, DCI format 2A, DCI format 3 and DCI format 3A and so on, wherein, the DCI format 0 is used to indicate scheduling of a Physical Uplink Shared Channel (PUSCH for short);

DCI format 1, DCI format 1A, DCI format 1B, DCI format 1C, and DCI format 1D are used for different modes of one PDSCH codeword scheduling;

DCI format 2, DCI format 2A and DCI format 2B are used for different modes of spatial multiplexing;

DCI format 3 and DCI format 3A are used for different modes of Physical Uplink Control Channel (PUCCH for short) and power control signaling of PUSCH.

SUMMARY OF THE INVENTION

In the LTE and LTE-A networks, two UEs communicate with each other through a base station. However, in order to more effectively use network resources and due to requirements for new service modes, device to device (D2D) communication gets more and more attention. The D2D communication, mobile to mobile communication, terminal to terminal communication, and point to point communication are all applied in mobile communication networks. D2D communication between devices which are adjacent to each other substitutes a transmission mode of a traditional source device transferring data to a destination device via a base station. In the communication networks, the D2D communication uses radio resources for communication, and shares a wireless link between a device and a base station, which brings new problems to the management of the radio resources of the base station and has influences on the communication quality of the original network. Therefore, the patent document provides a mode for device to device communication, so that the device to device communication is compatible with the original communication system, and the interference problems of the device to device communication and communication in the original network are solved, thereby improving spectrum efficiency.

The technical problem to be solved by a method and system for controlling data transmission of a UE provided by the patent document is how to implement the direct UE to UE communication.

In order to achieve the above inventive purpose, the patent document provides the following technical schemes:

A method for controlling data transmission of a User Equipment (UE), comprises:

a base station transmitting control information for instructing a first UE to transmit data to a second UE.

Preferably, the method further comprises the following features: the base station instructs the first UE to transmit data to the second UE through a Radio Network Temporary Identifier (RNTI), signaling in the control information or a format of the control information.

Preferably, the method further comprises the following features: the base station transmitting control information for instructing a first UE to transmit data to a second UE comprises:

the base station transmitting the same control information to the first UE and the second UE; or the base station transmitting one control information to the first UE, and transmitting another control information to the second UE.

Preferably, the method further comprises the following features:

when the base station transmits the same control information to the first UE and the second UE, the RNTI in the control information is a RNTI shared by the first UE and the second UE; and when the base station transmits one control information to the first UE and transmits another control information to the second UE, the RNTI corresponding to the control information is a user-specific radio network identifier or a radio network identifier shared by the first UE and the second UE, Preferably, the method further comprises the following features: the control information is carried in a Medium Access Control (MAC) Control Element (CE), in a physical downlink control channel or in Radio Resource Control (RRC) configuration signaling.

Preferably, the method further comprises the following features: the control information further comprises one or more of a resource field, transmission power control, a Modulation and Coding Scheme (MCS), a process number, pre-coding and a data demodulation pilot cyclic shift.

A method for controlling data transmission of a User Equipment (UE), comprises:

a first UE receiving control information for instructing the first UE to transmit data to a second UE; and the first UE transmitting data to the second UE according to the control information.

Preferably, the method further comprises the following features: the first UE transmits data to the second UE by using a Radio Network Temporary Identifier (RNTI) shared by the first UE and the second UE.

Preferably, the method further comprises the following features: the first UE transmits data to the second UE through an uplink subframe, a downlink subframe or a special subframe, wherein, the special subframe is a preset transmission unit dedicated to data transmission between the UEs.

Preferably, the method further comprises the following features:

the first UE transmits data to the second UE in a form of Physical Uplink Shared Channel (PUSCH) or a form of Physical Downlink Shared Channel (PDSCH).

Preferably, the method further comprises the following features: a transmission mode of the PDSCH is a transmission mode applying a downlink user-specific pilot.

A method for controlling data transmission of a User Equipment (UE), comprises:

a second UE receiving control information for instructing a first UE to transmit data to the second UE; and the second UE receiving data from the first UE according to the control information.

Preferably, the method further comprises the following features: the method further comprises:

the second UE feeding back at least one of following information through a Physical Uplink Control Channel (PUCCH): Acknowledgement/Negative Acknowledgement (ACK/NACK) information of the data received from the first UE and state information of a channel between the first UE and the second UE.

Preferably, the method further comprises the following features: the PUCCH used by the second UE to transmit the ACK/NACK information is determined by any one of the following modes:

mode one: determining the PUCCH according to signaling transmitted by the base station to the second UE; and mode two: determining the PUCCH according to a location of a physical downlink control channel carrying scheduling information that the data is transmitted from the first UE to the second UE.

Preferably, the method further comprises the following features: the second UE feeds back the state information of the channel between the first UE and the second UE through a PUCCH configured by the signaling of the base station.

A system for controlling data transmission of a User Equipment (UE), comprising:

a transmission apparatus, configured to transmit control information for instructing a first UE to transmit data to a second UE.

Preferably, the system further comprises the following features: the transmission apparatus is configured to instruct the first UE to transmit data to the second UE through a Radio Network Temporary Identifier (RNTI), signaling in the control information or a format of the control information.

Preferably, the system further comprises the following features: the transmission apparatus comprises:

a first transmission module, configured to transmit the same control information to the first UE and the second UE; or a second transmission module, configured to transmit one control information to the first UE, and transmit another control information to the second UE.

Preferably, the system further comprises the following features:

the RNTI in the control information transmitted by the first transmission module is a RNTI shared by the first UE and the second UE; and the RNTI corresponding to the control information transmitted by the second transmission module is a user-specific radio network identifier or a radio network identifier shared by the first UE and the second UE, Preferably, the system further comprises the following features: the control information transmitted by the transmission apparatus is carried in a Medium Access Control (MAC) Control Element (CE), in a physical downlink control channel or in Radio Resource Control (RRC) configuration signaling.

Preferably, the system further comprises the following features: the control information transmitted by the transmission apparatus further comprises one or more of a resource field, transmission power control, a Modulation and Coding Scheme (MCS), a process number, pre-coding and a data demodulation pilot cyclic shift.

A system for controlling data transmission of a User Equipment (UE), comprises:

a reception apparatus, configured to receive control information for instructing the first UE to transmit data to a second UE; and a transmission apparatus, configured to transmit data to the second UE according to the control information.

Preferably, the system further comprises the following features:

the transmission apparatus is further configured to transmit data to the second UE by using a Radio Network Temporary Identifier (RNTI) shared by the first UE and the second UE.

Preferably, the system further comprises the following features:

the transmission apparatus is further configured to transmit data to the second UE through an uplink subframe, a downlink subframe or a special subframe, wherein, the special subframe is a preset transmission unit dedicated to data transmission between the UEs.

Preferably, the system further comprises the following features:

the transmission apparatus is further configured to transmit data to the second UE in a form of Physical Uplink Shared Channel (PUSCH) or a form of Physical Downlink Shared Channel (PDSCH).

Preferably, the system further comprises the following features: a transmission mode of the PDSCH used by the transmission apparatus is a transmission mode applying a downlink user-specific pilot.

A system for controlling data transmission of a User Equipment (UE), comprises:

a first reception apparatus, configured to receive control information for instructing a first UE to transmit data to a second UE; and a second reception apparatus, configured to receive data from the first UE according to the control information.

Preferably, the system further comprises the following features: the system further comprises:

a transmission apparatus, configured to feed back at least one of following information through a Physical Uplink Control Channel (PUCCH): Acknowledgement/Negative Acknowledgement (ACK/NACK) information of the data received from the first UE and state information of a channel between the first UE and the second UE.

Preferably, the system further comprises the following features: the transmission apparatus is configured to determine the PUCCH used to transmit the ACK/NACK information by any one of the following modes:

mode one: determining the PUCCH according to signaling transmitted by the base station to the second UE; and mode two: determining the PUCCH according to a location of a physical downlink control channel carrying scheduling information that the data is transmitted from the first UE to the second UE.

Preferably, the system further comprises the following features: the transmission apparatus feeds back the state information of the channel between the first UE and the second UE through a PUCCH configured by the signaling of the base station.

By scheduling physical resources of device to device communication by a base station, the technical scheme provided by the embodiments of the present invention solves the interference problems of the device to device communication and communication in the original network, realizes the direct UE to UE communication, and improves spectrum efficiency.

PREFERRED EMBODIMENTS OF THE PRESENT INVENTION

In order to make purposes, technical schemes and advantages of the patent document more clear and apparent, the embodiments of present invention will be further described in detail hereinafter in conjunction with accompanying drawings and specific embodiments. It should be illustrated that, in the case of no conflict, the embodiments of this application and the features in the embodiments could be combined randomly with each other.

It should be illustrated that the base station described herein includes one or more of devices such as a NodeB, an eNode B, a Home eNodeB, a pico eNodeB and a Relay etc.

Figure 8:
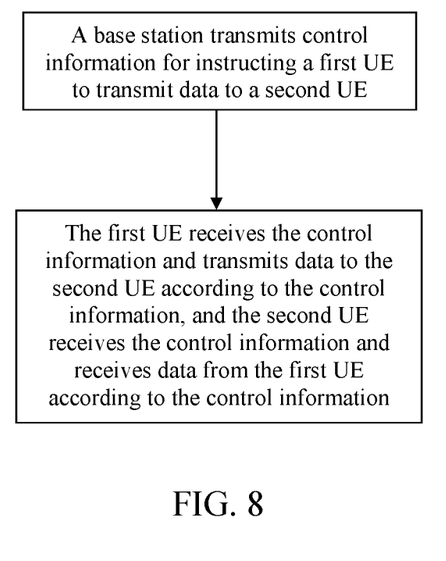
FIG. 8 is a diagram of a basic flow of embodiments in the patent document.

FIG. 8 illustrates a basic flow of embodiments in the patent document.

For the base station, a base station transmits control information for instructing a first UE to transmit data to a second UE.

When the control information is transmitted to UE1 and UE2, there are two specific transmission modes:

the first transmission mode is that the base station transmits the same control information to the first UE and the second UE; and the second transmission mode is that the base station transmits one control information to the first UE, and transmits another control information to the second UE.

In a practical application, the above control information can directly multiplex control information for controlling data transmission between a base station and a UE in the related art. That is, in the practical application, one control information is transmitted, which is used to control data transmission between a base station and a UE or to control data transmission between two UEs. The method for distinguishing such two transmission scenarios is specifically as follows:

the base station instructs the first UE to transmit data to the second UE through a RNTI, signaling or a format of the control information.

Specifically, as the base station can not only control the communication between the UE and the base station, but also can control the communication between the UEs, in order to distinguish between which two devices the transmission is controlled by the control information, the patent document proposes the following scheme:

Scheme one: the base station distinguishing whether the control information is used to control data transmission between the base station and the UE or to control data transmission between two UEs by using different RNTIs in the control information;

For example, for UE1, there are two scenarios for data transmission, which are communication between UE1 and the base station and communication between UE1 and UE2, and two RNTIs may be pre-configured for UE1, for example, RNTI-1 and RNTI-2, and the RNTI-1 is set as a RNTI used when the base station controls data transmission between UE1 and the base station, while the RNTI-2 is a RNTI used when data transmission between UE1 and other UE is controlled. When data transmission is performed between UEs, a RNTI in the control information transmitted by the base station to UE1 is the RNTI-2, and UE1 can know that it needs to perform data transmission between UEs by analyzing the control information.

It should be illustrated that in scheme one, if the base station transmits the same message to UE1 and UE2, the RNTI used by the base station should be a RNTI shared by UE1 and UE2; and if the base station transmits one control information to UE1 and transmits another control information to UE2, the RNTI corresponding to the control information is a UE-specific radio RNTI or a RNTI shared by UE1 and UE2.

Scheme two: when the same RNTI is used in the control information, the base station distinguishing whether the control information is used to control data transmission between the base station and the UE or to control data transmission between two UEs by using different signaling in the control information;

This scheme will still be described by the above example here, i.e., by the same RNTI being used in two transmission scenarios for UE1. The base station can implement distinguishing the transmission scenarios by carrying different signaling information in the control information, for example, carrying different information and dedicated signaling identities in the control information. For UE1, dedicated signaling identity A represents data transmission between the base station and UE1, and dedicated signaling identity B represents data transmission between UEs.

It should be illustrated that in scheme two, if the base station transmits the same control information to UE1 and UE2, the RNTI used by the base station should be a RNTI shared by UE1 and UE2; and if the base station transmits one control information to UE1 and transmits another control information to UE2, the RNTI in the control information is a UE-specific RNTI or a RNTI shared by UE1 and UE2.

Scheme three: when the same RNTI is used in the control information, the base station distinguishing whether the control information is used to control data transmission between the base station and the UE or to control data transmission between two UEs by transmitting different format types of control information;

This scheme will still be described by the above example herein, i.e., by the same RNTI being used in two transmission scenarios for UE1. The base station can also implement distinguishing the transmission scenarios by different formats of control information, for example, a DCI Format type, wherein, DCI Format A represents data transmission between the base station and UE1, and DCI Format B represents data transmission between UEs.

It should be illustrated that in scheme three, if the base station transmits the same control information to UE1 and UE2, the RNTI used by the base station should be a RNTI shared by UE1 and UE2; and if the base station transmits one control information to UE1 and transmits another control information to UE2, the RNTI in the control information is a UE-specific RNTI or a RNTI shared by UE1 and UE2.

Wherein, the UE-specific RNTI may be a Cell-Radio Network Temporary Identity (C-RNTI) etc.

It can be known from the above contents that by managing the control information, the patent document solves interference problems of the device to device communication and communication in the original network.

Wherein, the control information is carried in a MAC CE, in a physical downlink control channel or in RRC configuration signaling.

The control information further comprises one or more of a resource field, transmission power control, a MCS, a process number, pre-coding and a data demodulation pilot cyclic shift.

By scheduling physical resources of device to device communication, the base station triggers the direct UE to UE communication and achieves direct device to device communication.

For the first UE:

the first UE receives control information for instructing the first UE to transmit data to a second UE; and the first UE transmits data to the second UE according to the control information.

Wherein, the first UE transmits the data to the second UE by using a RNTI shared by the first UE and the second UE, thus ensuring implementing the scrambling and descrambling of information in a process of data transmission between UE1 and UE2 in a simple way.

The first UE transmits the data to the second UE through an uplink subframe, a downlink subframe or a special subframe, wherein, the special subframe is a preset transmission unit dedicated to data transmission between the UEs.

Wherein, the special subframe is a preset transmission unit dedicated to data transmission between the UEs, and it can be obtained by dividing the reserved transmission resources, and the reserved transmission resources may also be a part of resources cut from at least one of the uplink subframe and the downlink subframe.

Wherein, when the first UE transmits data to the second UE, the first UE transmits the data to the second UE in a form of PUSCH or a form of PDSCH.

It should be illustrated that, in a practical application, the data can be transmitted to the second UE in a form of PDSCH when the data transmission is performed by using an uplink subframe; and the data can also be transmitted to the second UE in a form of PUSCH when the data transmission is performed by using a downlink subframe.

Wherein, a transmission mode of the PDSCH is a transmission mode applying a downlink user-specific pilot. It should be illustrated that the user-specific pilot is a user-specific reference signal.

The first UE implements the direct UE to UE communication by receiving the control information and performing data transmission to the second UE according to the instruction of the control information.

For the second UE:

the second UE receives control information for instructing a first UE to transmit data to the second UE; and the second UE receives data from the first UE according to the control information.

The second UE feeds back at least one of following information to the first UE through a PUCCH: ACK/NACK information of the data received from the first UE and state information of a channel between the first UE and the second UE.

Wherein, the state information may be at least one of Channel Quality indicator, Precoding Matrix Indicator (PMI) and Rank Indication (RI).

For the PUCCH used by the second UE to transmit the ACK/NACK information to the first UE, it is determined by the second UE by any one of the following modes:

mode one: determining the PUCCH according to signaling transmitted by the base station to the second UE; and mode two: determining the PUCCH according to a location of a physical downlink control channel carrying scheduling information that the data is transmitted from the first UE to the second UE.

For the state information of the channel between the first UE and the second UE fed back by the second UE, it is transmitted by the second UE through a PUCCH configured by the signaling of the base station.

It should be illustrated that, the embodiment is described here by taking UE1 communicating to UE2 as an example, and of course, it is also applicable for UE2 communicating to UE1. Of course, UE2 can also transmit data to UE1 at the same time when UE1 transmits data to UE2. UE1 and UE2 can use the same type of subframes (for example, uplink subframes, downlink subframes or special subframes) or can also use different types of subframes when transmitting data. For example, UE1 transmits data to UE2 in uplink subframes and UE2 transmits data to UE1 in downlink subframes, or UE1 transmits data to UE2 in downlink subframes and UE2 transmits data to UE1 in uplink subframes.

The second UE knows data transmission between itself and the first UE by receiving the control information, thus receiving the data transmitted by the first UE, and implementing the direct UE to UE communication.

Embodiment One

The embodiment will be described firstly by taking UE1 transmitting information to UE2 as an example.

A base station receives from UE1 a request for transmitting data from UE1 to UE2, and transmits downlink control information 1 to both UE1 and UE2. UE1 transmits data to UE2 in physical resources according to downlink control information 1, and UE2 receives the data transmitted by UE1 in corresponding physical resources according to the downlink control information 1, wherein, the downlink control information 1 represents scheduling information that the data is transmitted by UE1 to UE2, and the downlink control information 1 is carried in a physical downlink control channel, i.e., carried in a DCI Format X;

UE2 feeds back at least one of following information to UE1 by using a PUCCH, which comprises:

Acknowledgement/Negative Acknowledgement (ACK/NACK) information of the data received from the UE1 and state information of a channel between UE1 and UE2.

The PUCCH resources for feeding back the ACK/NACK can be determined according to a PUCCH location carrying scheduling information of the data or configured according to the signaling transmitted by the base station to UE2;

the PUCCH resources for feeding back the state information of the channel between UEs are configured according to signaling;

UE1 transmits data to UE2 according to clocks of UE1 and the base station, i.e., a subframe initial location of data transmitted by UE1 to UE2 is the same as that of data transmitted by UE1 to the base station.

The embodiment will then be described by taking UE2 transmitting data to UE1 as an example.

The base station receives from UE2 a request for transmitting data from UE2 to UE1, and transmits downlink control information 3 to UE1 and UE2. UE2 transmits data to UE1 in physical resources according to the downlink control information 3, and UE1 receives the data transmitted by UE2 in corresponding physical resources according to downlink control information 3, wherein, the downlink control information 3 represents scheduling information that the data is transmitted by UE2 to UE1, and the downlink control information 3 is carried in a physical downlink control channel, i.e., carried in a DCI Format X.

UE1 feeds back at least one of following information to UE2 by using a PUCCH, which comprises:

Acknowledgement/Negative Acknowledgement (ACK/NACK) information of the data received from the UE2 and state information of a channel between UE2 and UE1;

UE2 transmits data to UE1 according to a timing relationship between UE2 and the base station.

It should be illustrated that, in embodiment one, the downlink control information includes one or more of a resource field, transmission power control, a Modulation and Coding Scheme (MCS), a redundancy version, a new data instruction, a process number, pre-coding and a data demodulation pilot cyclic shift.

The downlink control information includes a Radio Network Temporary Identifier (RNTI), for identifying UEs which transmits data therebetween.

In the present embodiment, the RNTI of UE1 is a C-RNTI of UE1 or a RNTI configured by the base station for UE1; and the RNTI of UE2 is a C-RNTI of UE2 or a RNTI configured by the base station for UE2.

In the above embodiment, both the downlink information 1 and 3 includes RNTIs of UE1 and UE2.

Embodiment 2

Different from embodiment one, which is described by taking the base station transmitting the same control information to the first UE and the second UE as an example, embodiment two is described by taking the base station transmitting one control information to the first UE and transmitting another control information to the second UE as an example.

The embodiment will be described firstly by taking UE1 transmitting information to UE2 as an example.

The base station receives from UE2 a request for transmitting data from UE1 to UE2, and transmits downlink control information 1 to UE1. UE1 transmits data to UE2 in corresponding physical resources according to the downlink control information 1, and the base station transmits downlink control information 2 to UE2, and UE2 receives data transmitted by UE1 in corresponding physical resources according to the downlink control information 2, wherein, both downlink control information 1 and downlink control information 2 represent scheduling information that the data is transmitted by UE1 to UE2, and the downlink control information 1 and the downlink control information 2 are carried in a PDCCH;

UE2 feeds back at least one of following information to UE1 by using a PUCCH, which comprises:

Acknowledgement/Negative Acknowledgement (ACK/NACK) information of the data received from the UE1 and state information of a channel between UE1 and UE2.

The embodiment will be described then by taking UE2 transmitting data to UE1 as an example.

The base station receives from UE1 a request for transmitting data from UE1 to UE2, and transmits downlink control information 4 to UE2. UE2 transmits data to UE1 in corresponding physical resources according to the downlink control information 4, and the base station transmits downlink control information 3 to UE1, and UE1 receives data transmitted by UE2 in corresponding physical resources according to the downlink control information 3, wherein, both downlink control information 3 and downlink control information 4 represent scheduling information that the data is transmitted by UE2 to UE1, and the downlink control information 3 is carried in a physical downlink control channel, i.e., carried in a DCI Format X;

UE1 feeds back at least one of following information to UE2 by using a PUCCH, which comprises:

Acknowledgement/Negative Acknowledgement (ACK/NACK) information of the data received from the UE2 and state information of a channel between UE2 and UE1;

It should be illustrated that, in embodiment two, the downlink control information includes one or more of a resource field, transmission power control (TPC), a Modulation and Coding Scheme (MCS), a redundancy version, a new data instruction, a process number, pre-coding and a data demodulation pilot cyclic shift;

the base station transmits a PDCCH carrying the downlink control information 1 and the downlink control information 3 according to the RNTI of UE1;

the base station transmits a PDCCH carrying the downlink control information 2 and the downlink control information 4 according to the RNTI of UE2;

wherein, the PUCCH resources for feeding back the ACK/NACK can be determined according to a PDCCH location carrying scheduling information that the data is transmitted by the base station to the UE or configured according to the signaling;

the PUCCH resources for feeding back the state information of the channel between UEs are configured according to signaling;

The following embodiments 3 and 4 differ from the previous two embodiments in that the information in the present embodiment is not transmitted to a specific terminal, and instead, is transmitted to multiple terminals of a cell.

Embodiment Three

The present embodiment is described by using public information, wherein, the public information is divided according to the number of objects which receives the downlink control information, and if other UEs in addition to UE1 and UE2 receive the downlink control information, the downlink control information is referred to as public information, and if only UE1 and UE2 can receive the downlink control information and security of the downlink control information is high, the downlink control information is referred to as dedicated information.

Wherein, the public information is carried in a public physical channel, and the dedicated information is carried in a dedicated physical channel;

The embodiment will be described firstly by taking UE1 transmitting information to UE2 as an example.

A base station receives from both UE1 and UE2 a request for transmitting data from UE1 to UE2, and transmits public information 1 to UE1 and UE2. UE1 transmits data to UE2 in corresponding physical resources after receiving the public information 1, and UE2 receives the data from UE1 in corresponding physical resources after receiving the public information 1, wherein, the public information 1 is carried in a Medium Access Control (MAC) Control Element (CE) or in RRC configuration signalling, and the public information 1 represents scheduling information that the data is transmitted by UE1 to UE2;

UE2 feeds back at least one of following information to UE1 by using a PUCCH, which comprises:

Acknowledgement/Negative Acknowledgement (ACK/NACK) information of the data received from the UE1 and state information of a channel between UE1 and UE2.

The embodiment will be described then by taking UE2 transmitting information to UE1 as an example.

The base station receives from both UE1 and UE2 a request for transmitting data from UE2 to UE1, and transmits public information 2 to UE1 and UE2. UE2 transmits data to UE1 in corresponding physical resources after receiving the public information 2, and UE1 receives data from UE2 in corresponding physical resources after receiving the public information 2, wherein, the public information 2 is carried in a MAC CE or in RRC configuration signalling, and it represents scheduling information that the data is transmitted by UE2 to UE1;

UE1 feeds back at least one of following information to UE2 by using a PUCCH, which comprises:

Acknowledgement/Negative Acknowledgement (ACK/NACK) information of the data received from the UE2 and state information of a channel between UE2 and UE1.

The public information includes one or more of a resource field, transmission power control (TPC), a Modulation and Coding Scheme (MCS), a redundancy version, a new data instruction, a process number, pre-coding and a data demodulation pilot cyclic shift;

it should be illustrated that, in embodiment three, the PUCCH resources for feeding back the ACK/NACK are configured by signalling of the base station;

the PUCCH resources for feeding back the state information of the channel between UEs are configured by signalling of the base station.

Embodiment Four

The embodiment will be described firstly by taking UE1 transmitting information to UE2 as an example.

A base station actively transmits dedicated information 1 to UE1, and UE1 transmits data to UE2 in corresponding physical resources after receiving the dedicated information 1. The base station actively transmits dedicated information 2 to UE2, and UE2 receives data from UE1 in corresponding physical resources after receiving the dedicated information 2, wherein, the dedicated information 1 and the dedicated information 2 are carried in a MAC CE or in RRC configuration signalling, and the dedicated information 1 and the dedicated information 2 represent scheduling information that the data is transmitted by UE1 to UE2;

UE2 feeds back at least one of following information to UE1 by using a PUCCH, which comprises:

Acknowledgement/Negative Acknowledgement (ACK/NACK) information of the data received from the UE1 and state information of a channel between UE1 and UE2.

The embodiment will be described then by taking UE2 transmitting information to UE1 as an example.

The base station actively transmits dedicated information 4 to UE2, and UE2 transmits data to UE1 in corresponding physical resources after receiving the dedicated information 4. The base station actively transmits dedicated information 3 to UE1, and UE1 receives data from UE2 in corresponding physical resources after receiving the dedicated information 3, wherein, the dedicated information 3 and the dedicated information 4 are carried in a MAC CE or in RRC configuration signalling, and the dedicated information 3 and the dedicated information 4 represent scheduling information that the data is transmitted by UE2 to UE1;

UE1 feeds back at least one of following information to UE2 by using a PUCCH, which comprises:

Acknowledgement/Negative Acknowledgement (ACK/NACK) information of the data received from the UE2 and state information of a channel between UE2 and UE1.

It should be illustrated that, in embodiment four, the dedicated information includes one or more of a resource field, transmission power control (TPC), a Modulation and Coding Scheme (MCS), a redundancy version, a new data instruction, a process number, pre-coding and a data demodulation pilot cyclic shift;

UE1 feeds back the ACK/NACK of the data received from UE2 and/or the state information of the channel between UE2 and UE1 by using the PUCCH;

UE2 feeds back the ACK/NACK of the data received from UE1 and/or the state information of the channel between UE2 and UE1 by using the PUCCH;

the PUCCH resources for feeding back the ACK/NACK are configured by signalling of the base station;

the PUCCH resources for feeding back the state information of the channel between UEs are configured by signalling of the base station.

In embodiments one to four, the first UE (i.e., the UE which needs to transmit data in the above embodiments) transmits data to the second UE (i.e., the UE which needs to receive data in the above embodiments) through uplink subframes or downlink subframes.

When the first UE transmits data to the second UE through the uplink subframes, the first UE transmits the data to the second UE in a PUSCH spectrum mode or a PDSCH spectrum mode;

when the first UE transmits data to the second UE through the downlink subframes, the first UE transmits the data to the second UE in a PUSCH spectrum mode or a PDSCH spectrum mode.

The usage of the spectrum modes used by the subframe resources will be described in embodiments five to seven.

Embodiment Five

Figure 3:
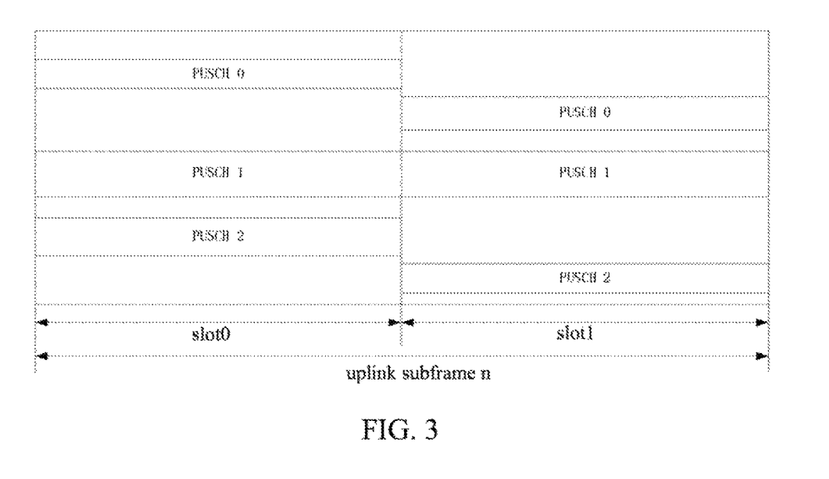
FIG. 3 is a first diagram of device to device communication using uplink subframes.

The present embodiment will be described by taking a UE transmitting data to another UE by using uplink subframe resources in a PUSCH spectrum mode as an example;

the base station transmits PUSCH0 to UE0 in uplink subframe n, and UE1 transmits PUSCH1 to UE2 in the uplink subframe n according to configuration of a base station, and UE3 transmits PUSCH2 to UE4 in the uplink subframe n according to the configuration of the base station, wherein, in communication among multiple groups of UEs, frequency domain locations of the PUSCH used by various user terminals for transmitting data may be the same or different, i.e., in the example, the frequency domain locations of PUSCH1, PUSCH0 and PUSCH2 may be the same or different, as shown in FIG. 3.

Embodiment Six

Figure 4:
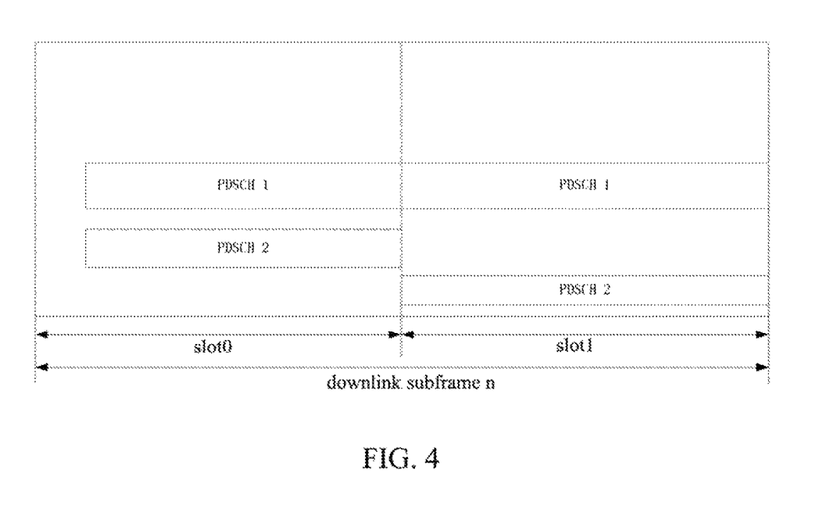
FIG. 4 is a diagram of device to device communication using downlink subframes.

The present embodiment will be described by taking a UE transmitting data to another UE by using downlink subframe resources in a PDSCH spectrum mode as an example;

UE1 transmits PDSCH1 to UE2 in downlink subframe n according to configuration of a base station, and UE3 transmits PDSCH2 to UE4 in the downlink subframe n according to the configuration of the base station, wherein, in communication among multiple groups of UEs, frequency domain locations of the PDSCH used by various user terminals for transmitting data may be the same or different, i.e., in the example, the frequency domain locations of PDSCH1 and PDSCH2 may be the same or different, as shown in FIG. 4.

Embodiment 7

Different from embodiments 5 and 6, the UE uses a PDSCH spectrum mode when using uplink subframes and uses a PUSCH spectrum mode when using downlink subframe resources. Embodiment seven will be described by way of example.

Figure 5:
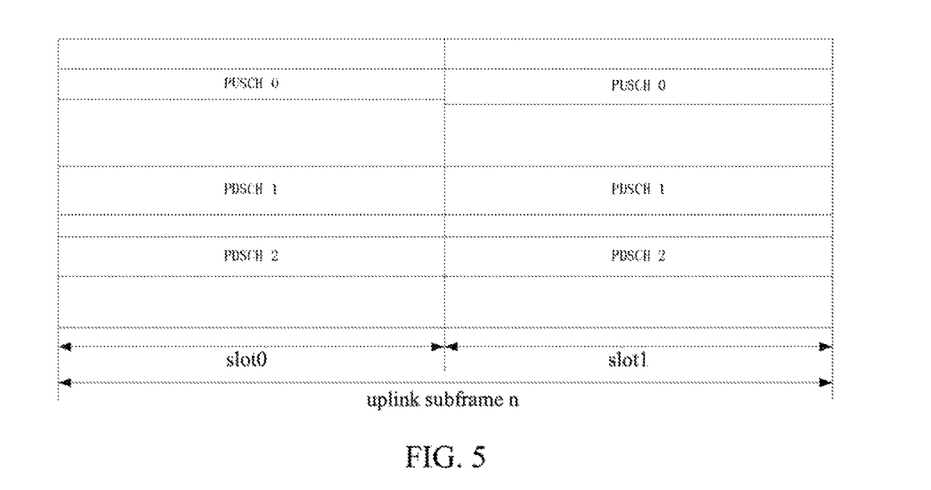
FIG. 5 is a second diagram of device to device communication using uplink subframes.

The base station transmits PUSCH0 to UE0 in uplink subframe n, and UE1 transmits PDSCH1 to UE2 in the uplink subframe n according to configuration of a base station, and UE3 transmits PDSCH2 to UE4 in the uplink subframe n according to the configuration of the base station, wherein, in communication among multiple groups of UEs, frequency domain locations of frequency spectrum mode of the channel used by various user terminals for transmitting data may be the same or different, i.e., in the example, the frequency domain locations of PDSCH1, PUSCH0 and PDSCH2 may be the same or different; wherein, PDSCH1 and PDSCH2 use a dedicated pilot transmission mode, as shown in FIG. 5.

In conjunction with the above embodiments, the patent document further provides a system for controlling data transmission of a UE, comprising:

a transmission apparatus, configured to transmit control information for instructing a first UE to transmit data to a second UE.

Wherein, the transmission apparatus is configured to instruct the first UE to transmit data to the second UE through a RNTI, signaling or a format of the control information.

Wherein, the transmission apparatus comprises:

a first transmission module, configured to transmit the same control information to the first UE and the second UE; or a second transmission module, configured to transmit one control information to the first UE and transmit another control information to the second UE.

The RNTI in the control information transmitted by the first transmission module is a RNTI shared by the first UE and the second UE; and the RNTI corresponding to the control information transmitted by the second transmission module is a user-specific radio network identifier or a radio network identifier shared by the first UE and the second UE.

Wherein, the control information transmitted by the transmission apparatus is carried in a MAC CE, in a physical downlink control channel or in RRC configuration signaling.

Wherein, the control information transmitted by the transmission apparatus further comprises one or more of a resource field, transmission power control, a MCS, a process number, pre-coding and a data demodulation pilot cyclic shift.

By scheduling physical resources of device to device communication, the base station triggers and achieves the direct UE to UE communication, and achieves the direct device to device communication.

Figure 6:
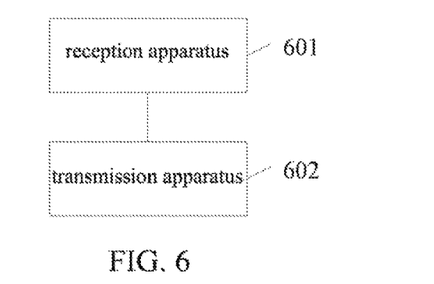
FIG. 6 is a structural diagram of another system embodiment for controlling transmission data of a UE according to the patent document.

FIG. 6 is a structural diagram of another system embodiment for data transmission of a UE according to the patent document. In conjunction with the above embodiment, the system embodiment illustrated in FIG. 6 comprises:

a reception apparatus 601, configured to receive control information for instructing the first UE to transmit data to a second UE; and a transmission apparatus 602, configured to transmit data to the second UE according to the control information.

Wherein, the transmission apparatus is configured to transmit data to the second UE by using a RNTI shared by the first UE and the second UE.

Wherein, the transmission apparatus is configured to transmit data to the second UE through an uplink subframe, a downlink subframe or a special subframe, wherein, the special subframe is a preset transmission unit dedicated to data transmission between the UEs.

Wherein, the transmission apparatus is configured to transmit data to the second UE in a form of PUSCH or a form of PDSCH.

Wherein, a transmission mode of the PDSCH used by the transmission apparatus is a transmission mode applying a downlink user specific pilot.

The first UE implements the direct UE to UE communication by receiving the control information and performing data transmission to the second UE according to the instruction of the control information.

Figure 7:
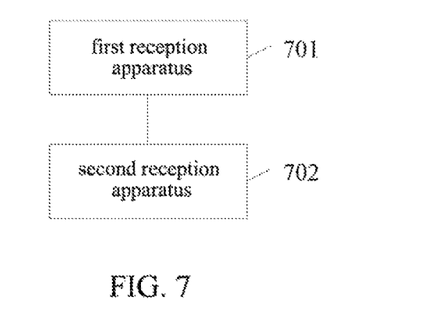
FIG. 7 is a structural diagram of another system for controlling transmission data of a UE according to the patent document.

FIG. 7 is a structural diagram of another system for controlling data transmission of a UE according to the patent document. In conjunction with the above embodiment, the system embodiment illustrated in FIG. 7 comprises:

a first reception apparatus 701, configured to receive control information for instructing the first UE to transmit data to a second UE; and a second reception apparatus 702, configured to receive data from the first UE according to the control information.

Alternatively, the system further comprises:

a transmission apparatus, configured to feed back at least one of following information to the first UE through a PUCCH: ACK/NACK information of the data received from the first UE and state information of a channel between the first UE and the second UE.

Wherein, the transmission apparatus is configured to determine the PUCCH used to transmit the ACK/NACK information to the first UE by any one of the following modes:

mode one: determining the PUCCH according to signaling transmitted by the base station to the second UE; and mode two: determining the PUCCH according to a location of a physical downlink control channel carrying scheduling information that the data is transmitted from the first UE to the second UE.

Wherein, the transmission apparatus feeds back the state information of the channel between the first UE and the second UE to the first UE through a PUCCH configured by the signaling of the base station.

The second UE knows data transmission between itself and the first UE by receiving the control information, thus receiving the data transmitted by the first UE and implementing the direct UE to UE communication.

A person having ordinary skill in the art can understand that all or a part of steps in the above example can be implemented by the procedure of computer program, which can be stored in a computer readable storage medium and can be executed in a corresponding hardware platform (for example, a system, a device, an apparatus and a component etc.), and when the computer program is executed, one of steps of the method embodiment or a combination thereof is included.

Alternatively, all or a part of steps in the above embodiments can also be implemented by integrated circuits, and these steps can be respectively made into a plurality of integrated circuit modules; alternatively, it is implemented by making a plurality of modules or steps into a single integrated circuit module. Thus, the patent document is not limited to any specific combinations of hardware and software.

Various apparatus, functional modules or functional units in the aforementioned embodiments can be implemented with general computing apparatuses, and they can be integrated in a single computing apparatus, or distributed onto a network composed of a plurality of computing apparatuses.

When various apparatus, functional modules or functional units in the aforementioned embodiments can be implemented in a form of software functional modules and sold or used as an independent product, they can be stored in a computer readable storage medium, which may be a read-only memory, a disk or a CD etc.

The above description is merely specific embodiments of the present invention. However, the protection scope of the patent document is not limited thereto. Changes or substitutions can easily be reached by a person having ordinary skill in the art within the technical scope disclosed by the patent document, and all of the changes or substitutions should be included in the protection scope of the patent document. Therefore, the protection scope of the patent document is defined by the protection scope of the claims.

INDUSTRIAL APPLICABILITY

By scheduling physical resources of device to device communication by a base station, the technical scheme provided by the embodiments of the present invention, it solves the interference problems of the device to device communication and communication in the original network and implements the direct UE to UE communication and improves spectrum efficiency.

What is claimed is:

1. A method for controlling data transmission of a User Equipment (UE), comprising:

a second UE receiving control information for instructing the second UE to receive data from a first UE, wherein the control information is transmitted on Physical Downlink Control Channel (PDCCH) and a Radio Network Temporary Identifier (RNTI), a signaling in the control information, or a format of the control information on the PDCCH indicates that the control information is used to control data transmission between the first UE and the second UE;

the second UE receiving data from the first UE through Physical Uplink Shared Channel (PUSCH) according to the control information; and the second UE feeding back Acknowledgement/Negative Acknowledgement (ACK/NACK) information of the data received from the first UE through a Physical Uplink Control Channel (PUCCH);

wherein, the PUCCH used by the second UE to transmit the ACK/NACK information is determined by any one of following modes:

mode one: determining the PUCCH according to signaling transmitted by a base station to the second UE; and mode two: determining the PUCCH according to a location of a physical downlink control channel carrying scheduling information that the data is transmitted from the first UE to the second UE.

2. The method according to claim 1, further comprising:
the second UE feeding back state information of a channel between the first UE and the second UE through the PUCCH.

3. The method according to claim 2, wherein, the second UE feeds back the state information of the channel between the first UE and the second UE through the PUCCH configured by signaling of a base station.

4. A system for controlling data transmission of a User Equipment (UE), comprising:
a first reception apparatus, configured to receive control information for instructing a first UE to transmit data to a second UE, wherein the control information is transmitted on Physical Downlink Control Channel (PDCCH) and a Radio Network Temporary Identifier (RNTI), a signaling in the control information, or a format of the control information on the PDCCH indicates that the control information is used to control data transmission between the first UE and the second UE; and
a second reception apparatus, configured to receive data from the first UE through Physical Uplink Shared Channel (PUSCH) according to the control information;
the system further comprising a transmission apparatus, configured to feed back Acknowledgement/Negative Acknowledgement (ACK/NACK) information of the data received from the first UE through a Physical Uplink Control Channel (PUCCH);
wherein, the transmission apparatus is configured to determine the PUCCH used to transmit the ACK/NACK information by any one of following modes:
mode one: determining the PUCCH according to signaling transmitted by a base station to the second UE; and
mode two: determining the PUCCH according to a location of a physical downlink control channel carrying scheduling information that the data is transmitted from the first UE to the second UE.

5. The system according to claim 4, wherein
the transmission apparatus is further configured to feed back state information of a channel between the first UE and the second UE through the PUCCH.

6. The system according to claim 5, wherein, the transmission apparatus is configured to feed back the state information of the channel between the first UE and the second UE through the PUCCH configured by signaling of a base station.

7. A computer program product comprising a computer-readable storage medium with code stored thereon, the code comprising instructions that when executed by a processor cause the processor to perform the following steps:
receiving control information for instructing a second UE to receive data from a first UE, wherein the control information is transmitted on Physical Downlink Control Channel (PDCCH) and a Radio Network Temporary Identifier (RNTI), a signaling in the control information, or a format of the control information on the PDCCH indicates that the control information is used to control data transmission between the first UE and the second UE;
receiving data from the first UE through Physical Uplink Shared Channel (PUSCH) according to the control information; and
the second UE feeding back Acknowledgement/Negative Acknowledgement (ACK/NACK) information of the data received from the first UE through a Physical Uplink Control Channel (PUCCH);
wherein, the PUCCH used by the second UE to transmit the ACK/NACK information is determined by any one of following modes:
mode one: determining the PUCCH according to signaling transmitted by a base station to the second UE; and
mode two: determining the PUCCH according to a location of a physical downlink control channel carrying scheduling information that the data is transmitted from the first UE to the second UE.

* * * * *